United States Patent [19]

Reisdorf

[11] Patent Number: 5,454,646
[45] Date of Patent: Oct. 3, 1995

[54] JOURNAL BEARING FOR USE WITH HIGH SPEED SHAFTING

[75] Inventor: Paul W. Reisdorf, Dunlap, Ill.

[73] Assignee: Caterpillar Inc., Peoria, Ill.

[21] Appl. No.: 330,296

[22] Filed: Oct. 27, 1994

[51] Int. Cl.$^6$ .............................. F16C 33/66; F04B 35/02
[52] U.S. Cl. .............................. 384/99; 384/901; 417/407
[58] Field of Search .............................. 384/99, 100, 114, 384/291, 901; 417/407

[56] References Cited

U.S. PATENT DOCUMENTS

| | | | |
|---|---|---|---|
| 3,993,370 | 11/1976 | Woolenweber | 384/291 X |
| 4,371,219 | 2/1983 | Yamane | 384/291 |
| 4,427,309 | 1/1984 | Blake | 384/99 X |
| 4,560,325 | 12/1985 | Yoshioka et al. | 417/407 |
| 4,902,144 | 2/1990 | Thoren | 384/901 X |
| 5,246,352 | 9/1993 | Kawakami | 384/901 X |
| 5,281,032 | 1/1994 | Slocum | 384/118 |

Primary Examiner—Thomas R. Hannon
Attorney, Agent, or Firm—Dennis C. Skarvan

[57] ABSTRACT

A journal bearing for use with a turbocharger includes a free floating bushing rotatable between a shaft and housing. In one embodiment, a single oil feed passage is provided at an angle in the housing, and a number of radially disposed oil transfer passages are provided in the free floating bushing. The angle of the housing passage relative the bushing passages is such that oil flowing between the passages imparts an angular momentum to the bushing opposite the shaft rotation to slow the rotational velocity of the bushing. Alternately, the housing passage may be radially disposed and the bushing passages may be inclined at an angle relative to the housing passage to similarly impart an angular momentum to the floating bushing in a direction opposite the directing of rotation of the shaft, or both the housing passage and the bushing passages may be inclined relative one another to impart an angular momentum to the bushing in a direction opposite the direction of rotation of the shaft.

10 Claims, 3 Drawing Sheets

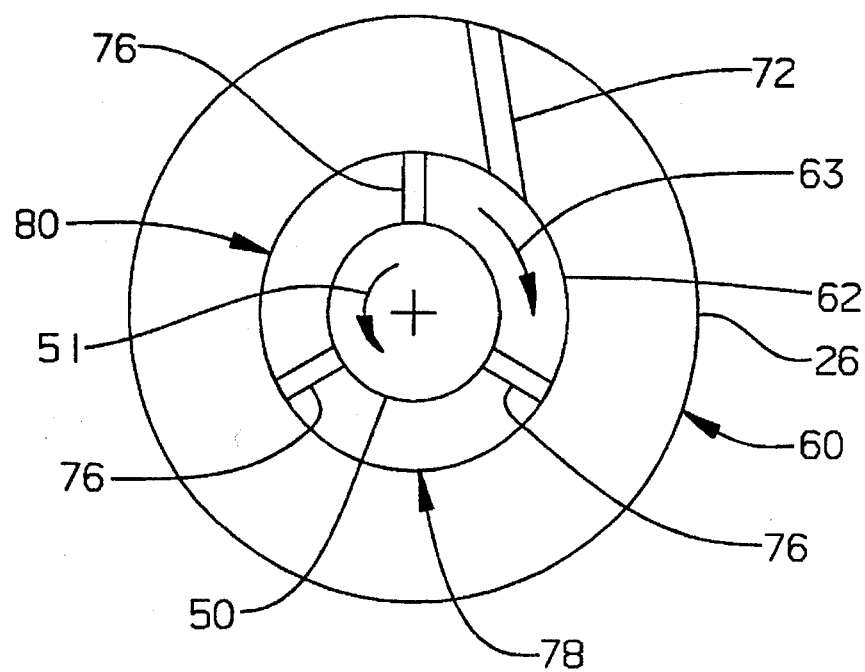
Fig_2_
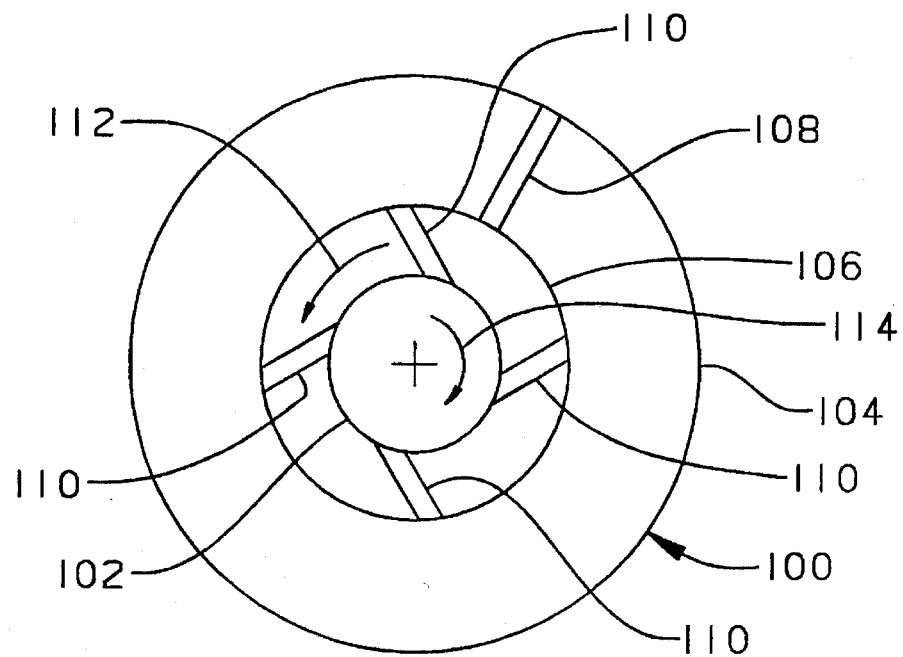
Fig_3_

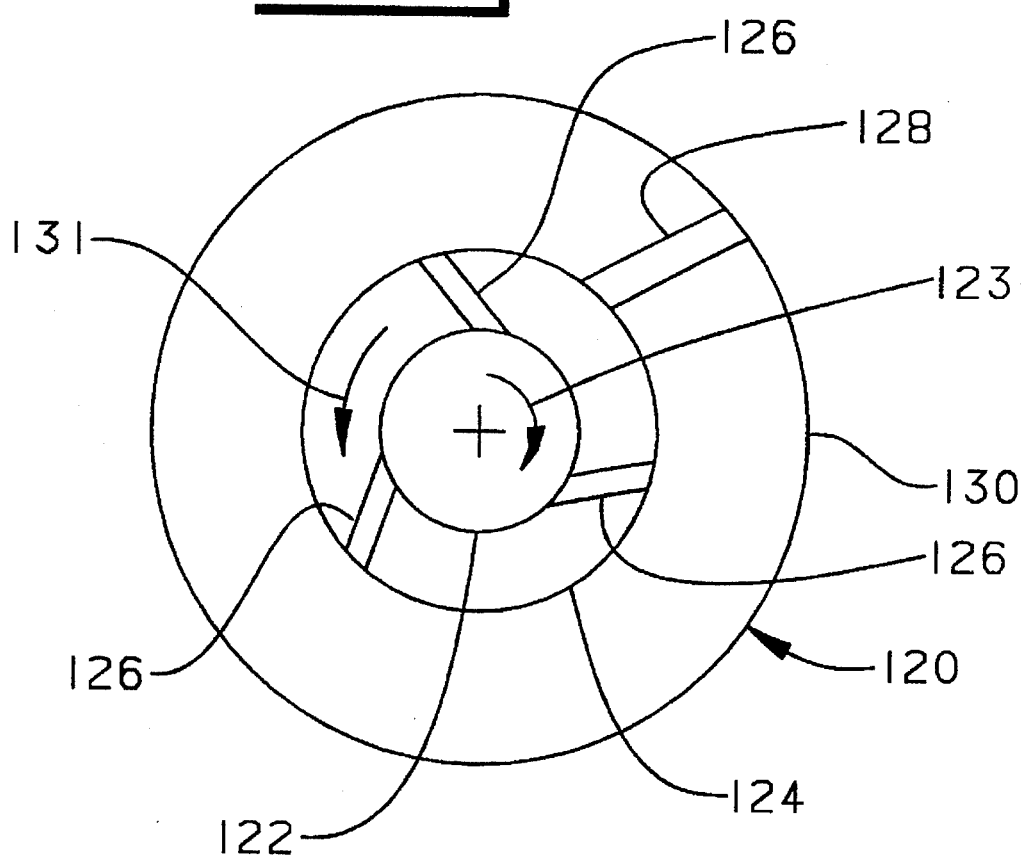

JOURNAL BEARING FOR USE WITH HIGH SPEED SHAFTING

TECHNICAL FIELD

The present invention relates generally to journal bearings and, more particularly, to a hydrodynamic journal bearing adapted for use with the high speed shafting of a turbocharger.

BACKGROUND ART

In bearing applications having high speed shafting, such as in turbochargers, auxiliary power units, or small gas turbine engines, a floating bushing is provided between the shaft and bearing housing. Lubricating fluid delivered under pressure to the floating bushing and shaft creates a hydrodynamic film at the bushing/shaft and bushing/housing interfaces to provide the damping necessary for controlling shaft motion.

Because of the small radial clearances present between the bushing and shaft, viscous drag imparts angular momentum to the floating bushing and tends to rotate the floating bushing with the shafting. While some degree of rotation is desirable for the floating bushing in order to optimize wear at the shaft/bushing and bushing/housing interfaces, in high speed shaft applications the rotational velocity of the floating bushing tends to approach that of the shafting due to the viscous drag effects. High floating bushing velocities result in loss of damping and control of the shaft motion and, ultimately, increase the wear at the bushing/shaft interface.

What is needed is a free floating bushing arrangement for use with high speed shafting in which the rotational speed of the bushing is reduced from that of the shafting. Such a bushing arrangement should be particularly adapted for use with turbochargers and, preferably, should reduce the rotational speed of the bushing while maintaining damping and control of the shaft motion and without increasing wear at the bushing/shaft or bushing/housing interfaces.

DISCLOSURE OF THE INVENTION

According to one embodiment of the present invention, a journal bearing is disclosed comprising a housing, a shaft rotatable in a first direction within the housing, a bearing journal rotatably disposed between the housing and the shaft, a first lubricating passage disposed in the housing, the first lubricating passage supplying lubricating oil to the bearing journal, a second lubricating passage disposed in the bearing journal, the second lubricating passage receiving the lubricating oil from the first lubricating passage and supplying the lubricating oil to the shaft, wherein the first lubricating passage and the second lubricating passage are oriented relative one another to impart an angular momentum to the bearing journal in a direction opposite the first direction of rotation.

According to another embodiment of the present invention, a turbocharger assembly is disclosed including a housing defining a compressor portion, a sump portion and a turbine portion, a compressor rotatably disposed in the compressor portion, a turbine rotatably disposed in the turbine portion, and a shaft connecting the compressor to the turbine, the shaft being rotatably disposed in a first direction of rotation within the sump portion. First and second bearing journals are rotatably disposed between the sump portion and the shaft, wherein the sump portion and the first and second bearing journals have lubricating passages oriented relative one another to impart an angular momentum to the first and second bearing journals in a direction opposite the first direction of rotation.

BRIEF DESCRIPTION OF THE DRAWINGS

FIG. 2 is a cross-sectional view of a bearing of the turbocharger assembly of FIG. 1 taken along lines 2—2 in the direction of the arrows indicated.

FIG. 3 is a cross-sectional view of an alternate bearing for the turbocharger assembly of FIG. 1.

FIG. 4 is a cross-sectional view of a second alternate bearing of the turbocharger assembly of FIG. 1.

BEST MODE FOR CARRYING OUT THE INVENTION

Figure 1:
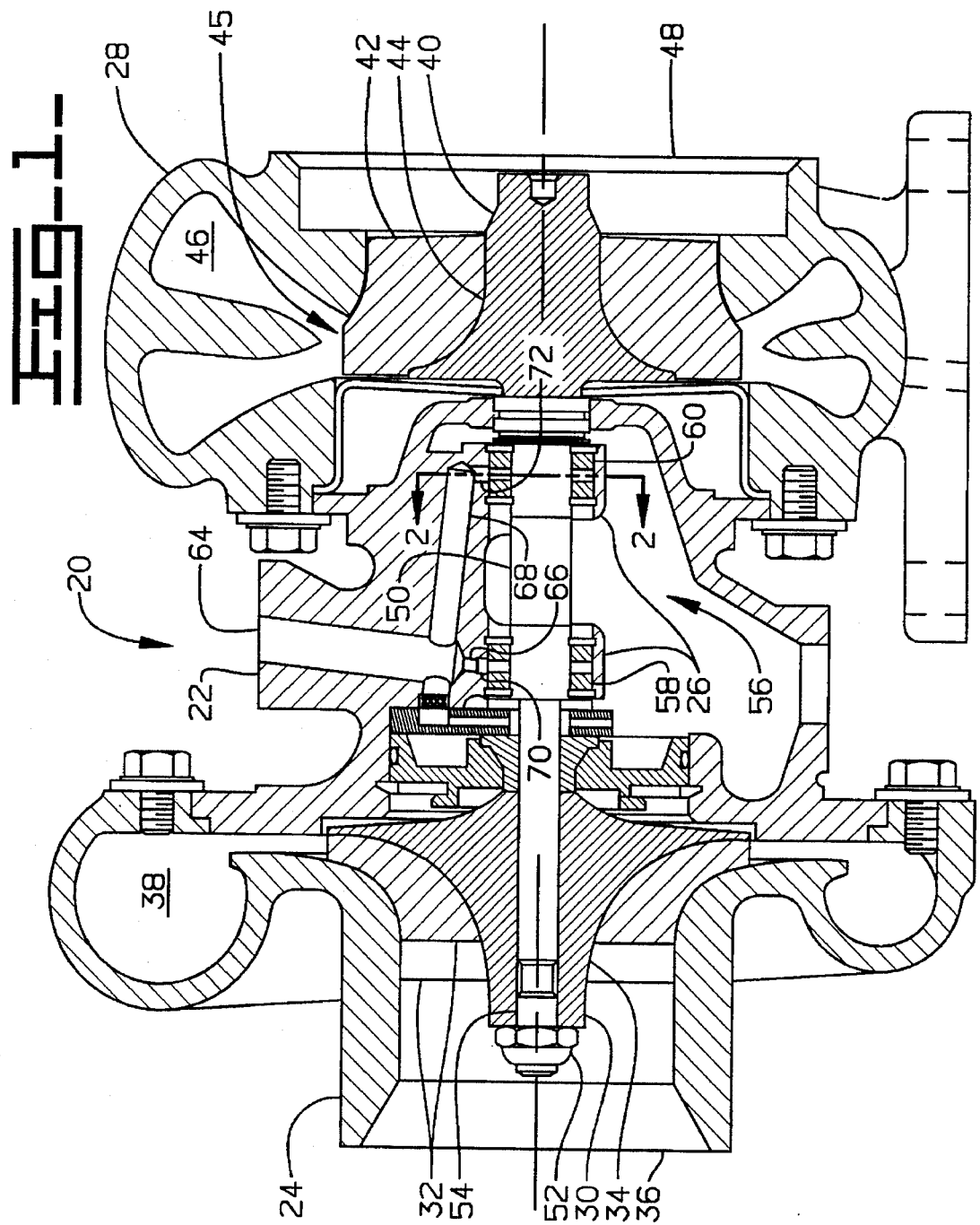
FIG. 1 is a cross-sectional view of a turbocharger assembly according to one embodiment of the present invention.

Referring now to FIG. 1, a turbocharger assembly 20 is shown. Turbocharger assembly 20 includes a stationary housing 22 defining a compressor portion 24, a sump portion 26 and a turbine portion 28.

A compressor 30 rotates within compressor portion 24 and, preferably, is a single centrifugal compressor or impeller including blades 32 integral with a hub 34. Turbocharger inlet air enters compressor 30 through inlet 36 and is pumped into scroll passageway 38. Scroll passageway 38 communicates with the inlet of an internal combustion engine, in the specific preferred embodiment a diesel engine (not shown).

A turbine 40 rotates within turbine portion 28 and, preferably, is a single radial turbine including blades 42 integral with a hub 44. High pressure exhaust gasses enter turbine 40 at inlet 45 from scroll passageway 46. Scroll passageway 46 communicates with a high pressure exhaust source of the internal combustion engine. The high pressure exhaust gasses are expanded by turbine 40 to extract the work necessary for driving compressor 30. The expanded exhaust gases are then exhausted at outlet 48 to a low pressure point in the exhaust system of the internal combustion engine.

Compressor 30 is driven by turbine 40 through a main shaft 50. Shaft 50 is integral with turbine 40 and extends from the hub 44 of turbine 40 to within the hub 34 of compressor 30. A fastener 52 and splines 54 fixedly attach compressor 30 to shaft 50 to form a rotor assembly 56 of turbocharger 20.

Rotor assembly 56 rotates at high speeds within housing 22, typically in the range of 100,000 rpm and upwards. As a result of such high speeds, rotor assembly 56 is both statically and dynamically balanced prior to assembly within the turbocharger 20 to minimize shaft dynamics.

Nevertheless, due to machining tolerances and assembly stack, a perfect balance is not readily achievable for rotor assembly 56. Instead, hydrodynamic bearings 58 and 60 support compressor 30 and turbine 40 cantilevered from either end of bearings 58 and 60, respectively. Bearings 58 and 60 are like in design and hereinafter are discussed interchangeably. The cantilevered mounting of compressor 30 and turbine 40, although providing a compact design having a single sump, further increases the amount of shaft motion which must be accommodated by the bearings 58 and 60. Therefore, it is critical to maintain damping of the shaft motion and to minimize the amount of wear incurred by bearings 58 and 60 during operation of turbocharger 20.

Referring now to FIG. 2, the present invention maintains damping of the shaft motion and reduces wear of bearings 58 and 60 by controlling the speed of bushing 62 relative to shaft 50. Referring back also to FIG. 1, lubricating fluid, in this case conventional engine oil, is supplied to bearings 58 and 60 by main passage 64. Passage 64 receives the oil under pressure from a separate source, in the preferred embodiment the engine oil system (not shown). Passages 66 and 68 communicate the oil to discreet passages 70 and 72 associated with bearings 58 and 60 respectively. In FIG. 2, passage 72 is inclined in a direction opposite the direction of rotation of shaft 50 and bushing 62 within sump portion 26 of housing 22 in order to provide the oil under pressure at a predetermined angle or orientation relative to feed passages 76 of bushing 62. Feed passages 76 are radially disposed in bushing 62 and communicate the oil further to shaft 50.

As is known in the art, a predetermined small radial clearance is provided at the bushing/housing interface (indicated at 78) and at the bushing/shaft interface (indicated at 80). Typically, the small radial clearance is a function of the diameter of the bushing 62 and is in the range of approximately 0.001–0.003 inches radial clearance per 1 inch of bushing diameter. In this specific embodiment, bearings 58 and 60 are each approximately 1 inch in diameter, thus resulting in a nominal radial clearance of 0.002 inches at each of interfaces 78 and 80.

Because bushing 62 is free to rotate between shaft 50 and housing 62, the rotation of shaft 50 in the direction of the arrow 51 shown therefor, (counter-clockwise) imparts angular momentum in the same direction due to the viscous drag effects of the oil resulting from such a small radial clearance. While some degree of rotation of bushing 62 is desirable in order for passages 76 to continually receive oil from passage 72 and to distribute the oil evenly about shaft 50, at such high turbocharger shaft speeds, the rotational velocity of bushing 62 approaches the shaft speed. As a result of such a high bushing velocity, the oil film thickness is reduced at the bushing/housing interface 78 resulting in a corresponding loss of the hydrodynamic effects provided by the oil film. Damping provided by the floating bushing is therefore reduced and shaft motion increases. Further, wear is increased at the bushing/housing interface 78.

The present invention controls the rotational velocity of bushing 62 by orienting passages 76 and 72 such that oil delivered by passage 72 imparts an angular momentum to bushing 62 in the opposite direction of rotation of shaft 50 and bushing 62, as shown by the direction of arrow 63 therefor (clockwise). As a result, the bushing velocity is controlled to a fraction of the shaft speed. For example, in the specific preferred embodiment shown in FIG. 2, the rotational speed of bushing 62 is controlled to approximately 50 percent or half of the rotational speed of shaft 50. As a result of the reduced bushing velocity, the oil film thickness is maintained at the bushing/housing interface 78 to maintain damping and control of shaft motion. Further, wear is apportioned substantially equally between the bushing/housing interface 78 and the shaft/bushing interface 80 to increase the overall life of bearing 60.

In FIG. 2, bushing 62 is shown having three passages 76 spaced an equidistant from one another. The particular number of passages can vary, however, according to the speed of shaft 50 and the vibrational resonance modes of rotor assembly 56. Similarly, sump portion 26 of housing 22 is shown having a single passage 72; however, two or more passages 72 are also contemplated depending on the speed of shaft 50 and the vibrational resonance mode of rotor assembly 56.

Referring now to FIG. 3, an alternate bearing arrangement 100 is shown for use with high speed shafting 102 similar to shafting 50. In FIG. 2, bearing arrangement 100 includes a sump portion 104 similar to sump portion 26 and a floating bushing 106 similar to bushing 62. Passage 108 is radially disposed in sump portion 104 and communicates oil from a high pressure source to bushing 106. Passages 110 of bushing 106 are inclined in a direction toward the direction of rotation of shaft 102 and bushing 106 in order to impart an angular momentum to bushing 106 in the direction shown by arrow 112 (counter-clockwise); that is, opposite the direction of rotation of shaft 102 and bushing 106 (clockwise) as indicated by the direction of arrow 114.

Referring now to FIG. 4, another alternate bearing arrangement 120 is shown for use with high speed shafting 122 similar to shafting 50. Bearing arrangement 120 combines the inclined passages shown in FIGS. 2 and 3 to provide increased anti-rotation for bushing 124. In particular, passages 126 are inclined in bushing 124 toward the direction of rotation shaft 122 and bushing 124, as indicated by the direction of the arrow 123 (clockwise) and passage 128 is inclined in housing portion 130 opposite the direction of rotation of shaft 122 and bushing 124. As a result, oil delivered under pressure by passage 128 to passages 126 imparts an increased angular momentum to bushing 124 in the direction shown by arrow 131; i.e., opposite the direction of rotation of shaft 122 and bushing 124.

I claim:

1. A journal bearing for use with high speed shafting, comprising:

a stationary housing;

a shaft rotatable in a first direction of rotation within said stationary housing;

a bearing journal rotatably disposed between said stationary housing and said shaft;

a first lubricating passage disposed in said stationary housing, said first lubricating passage supplying lubricating oil to said bearing journal;

a second lubricating passage disposed in said bearing journal, said second lubricating passage receiving the lubricating oil from said first lubricating passage and supplying the lubricating oil to said shaft;

said first lubricating passage and said second lubricating passage being oriented relative one another to impart an angular momentum to said bearing journal in a direction opposite said first direction of rotation.

2. The journal bearing of claim 1, wherein said second lubricating passage is radially disposed in said bearing journal and said first lubricating passage is inclined in said stationary housing opposite said first direction of rotation.

3. The journal bearing of claim 1, wherein said first lubricating passage is radially disposed in said stationary housing and said second lubricating passage is inclined in said bearing journal toward said first direction of rotation.

4. The journal bearing of claim 1, wherein said first lubricating passage is inclined in said stationary housing opposite said first direction of rotation and said second lubricating passage is inclined in said bearing journal toward said first direction of rotation.

5. A turbocharger assembly, comprising:

a stationary housing defining a compressor portion, a sump portion, and a turbine portion;

a compressor rotatably disposed in said compressor portion of said stationary housing;

a turbine rotatably disposed in said turbine portion of said stationary housing;

a shaft connecting said compressor to said turbine, said shaft being rotatably disposed in a first direction of rotation within said sump portion of said stationary housing;

first and second bearing journals rotatably disposed between said sump portion of said stationary housing and said shaft;

said sump portion of said stationary housing and said first and second bearing journals having lubricating passages oriented relative one another to impart an angular momentum to said first and second bearing journals in a direction opposite said first direction of rotation.

6. The turbocharger assembly of claim 5, wherein:

said sump portion of said stationary housing includes a first lubricating passage for supplying lubricating fluid to said first bearing journal bearing and a second lubricating passage for supplying lubricating fluid to said second bearing journal;

said first bearing journal includes a third lubricating passage for receiving the lubricating oil from said first lubricating passage and supplying the lubricating oil to said shaft; and said second bearing journal includes a fourth lubricating passage for receiving the lubricating oil from said second lubricating passage and supplying the lubricating oil to said shaft.

7. The turbocharger assembly of claim 6, wherein:

said first lubricating passage and said third lubricating passage are oriented relative one another to impart an angular momentum to said first bearing journal in a direction opposite said first direction of rotation; and said second lubricating passage and said fourth lubricating passage are oriented relative one another to impart an angular momentum to said second bearing journal in a direction opposite said first direction of rotation.

8. The turbocharger assembly of claim, 6, wherein:

said third lubricating passage is radially disposed in said first bearing journal and said first lubricating passage is inclined in said sump portion of said stationary housing opposite said first direction of rotation; and said fourth lubricating passage is radially disposed in said second bearing journal and said second lubricating passage is inclined in said sump portion of said stationary housing opposite said first direction of rotation.

9. The journal bearing of claim 6, wherein said first lubricating passage is radially disposed in said sump portion of said stationary housing and said third lubricating passage is inclined in said first bearing journal toward said first direction of rotation; and said second lubricating passage is radially disposed in said sump portion of said stationary housing and said fourth lubricating passage is inclined in said second bearing journal toward said first direction of rotation.

10. The journal bearing of claim 6, wherein said first lubricating passage is inclined in said sump portion of said stationary housing opposite said first direction of rotation and said third lubricating passage is inclined in said first bearing journal toward said first direction of rotation; and said second lubricating passage is inclined in said sump portion of said stationary housing opposite said first direction of rotation and said fourth lubricating passage is inclined in said second bearing journal toward said first direction of rotation.

\* \* \* \* \*